United States Patent [19]

Caldwell

[11] Patent Number: 4,473,609
[45] Date of Patent: Sep. 25, 1984

[54] COLORED EMBOSSED NEEDLE-BONDED FABRIC WALL COVERINGS AND METHOD OF MANUFACTURE

[75] Inventor: Kenneth G. Caldwell, Maytown, Pa.

[73] Assignee: Armstrong World Industries, Inc., Lancaster, Pa.

[21] Appl. No.: 542,716

[22] Filed: Oct. 17, 1983

[51] Int. Cl.³ .............................................. B32B 5/02
[52] U.S. Cl. ................................... 428/141; 156/148; 156/209; 156/220; 428/156; 428/161; 428/234; 428/247; 428/255; 428/280; 428/300; 428/904.4
[58] Field of Search ............... 428/141, 156, 172, 234, 428/280, 284, 300, 247, 255, 904.4; 156/148, 209, 220

[56] References Cited

U.S. PATENT DOCUMENTS 3,924,040  12/1975  Addre et al. ................... 156/148
4,007,071  2/1977   Addre et al. ................... 156/148
4,284,453  8/1981   Endrizzi ......................... 156/220

Primary Examiner—James J. Bell

[57] ABSTRACT

A non-woven material is applied to the surface of a woven scrim. The non-woven material is needle-bonded to the scrim. The composite structure is then embossed, and during the embossing operation, a uniform coloring is provided in the areas of the embossing. The embossed pattern is placed by a heated embosser on the composite structure and in the embossed areas, the heat of embossing causes the non-woven material to partially melt and assume a textured effect which mirrors the texture of the woven scrim.

3 Claims, 3 Drawing Figures

COLORED EMBOSSED NEEDLE-BONDED FABRIC WALL COVERINGS AND METHOD OF MANUFACTURE

CROSS-REFERENCE TO RELATED APPLICATION

This application is an improvement over the invention set forth in U.S. Pat. No. 3,924,040 issued Dec. 2, 1975, entitled "Embossed Needle-Bonded Fabric Wall Coverings." This patent is commonly assigned with the invention hereof.

FIELD OF THE INVENTION

The invention is directed to a wall covering structure and, more particularly, to a wall covering structure having a textured and colored surface, and the method of manufacture of said product.

DESCRIPTION OF THE PRIOR ART

It is old in the art to make a fabric covering by utilizing a woven or non-woven scrim structure and placing on one or both sides thereof a non-woven felted material. This felted material is then needle-bonded to the scrim. A very typical example of this type of product is the "Ozite TM" indoor-outdoor carpet.

U.S. Pat. No. 2,861,372 shows metal foil sheets being placed on either side of a woven fabric. The composite product is subjected to pressure and the foil sheets assume generally the textured effect of the woven inner core.

U.S. Pat. No. 3,924,040 is directed to an embossed needle-bonded fabric wall covering. This product is provided in different colors, but there is a uniform coloration across the whole product and there is not a difference in coloration in the area adjacent the embossed surfaces and the embossed surfaces themselves.

The invention herein is directed to an improved fabric appearance for use as a wall covering wherein the product is provided with an embossed pattern which mirrors the image of the embossing roll, and, at the same time, the secondary embossed pattern will mirror the general configuration of the supporting scrim for the fabric. In the area of the embossed pattern, there is a definite coloration change to provide a uniform coloring to the embossed areas which is of a noticeable different shade from the coloration of the non-embossed areas.

SUMMARY OF THE INVENTION

The closely woven scrim is used to stabilize a non-woven fabric. A felted non-woven fabric is needled to the scrim and, in general, provides a single flat surface product. The flat surface of the product is provided with an embossed pattern due to a heated embossing roll. The thermal embossing is carried out at a temperature to 480°-520° F. The melting point of the non-woven fabric is substantially below the melting point of the scrim (about 50° F. or more) and close to the temperature of the embossing roll. The heat from the embossing roll which embosses a pattern on the product will cause partial melting of the non-woven fabric fibers in the embossed area.

In addition, the higher temperature embossing, when utilized with polyester or polyester blends, has been found to provide a definite shade coloration difference in the embossed area over the coloration that exists in the non-embossed areas. This color change of the fibers provides a uniform coloration to the embossed areas and provides a noticeable aesthetic effect over that of the prior art, particularly U.S. Pat. No. 3,924,040.

DESCRIPTION OF THE PREFERRED EMBODIMENT

The invention is basically directed to the use of a scrim, either woven or non-woven, in a generally open or coarse weave which has applied to at least one surface thereof a non-woven felted fabric material. This material is needle-bonded to the scrim and then a decorative pattern is embossed on the composite product. The heat of embossing causes the needle-bonded felted fabric in the embossed areas to partially melt and take on a texturing which mirrors the configuration of the scrim.

Figure 1:
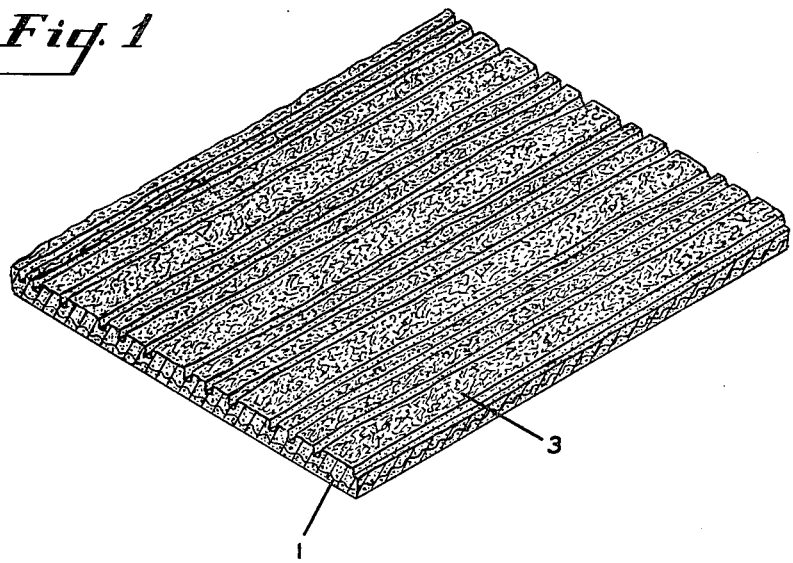
FIG. 1 is the perspective view of the product made by the invention herein.
Figure 2:
FIG. 2 is a cross-sectional view of the product made by the invention herein.

Referring now to FIGS. 1 and 2, the scrim may be a woven or non-woven fabric. Normally, it is a coarsely woven glass fiber scrim made with about 8-10 yarns per inch in its warp and woof directions. The scrim could be made from jute or a metal wire. The important characteristic of the scrim is that it will be a material which will not heat distort at the embossing temperature. The embossing temperature is carried out in the range of 480° to 520° F. and, therefore, the scrim must not be heat distortable at those temperatures.

On one surface of the scrim is placed a non-woven felted material. This material may be a 100% polyester material or it may be a blend of 50% or more polyester along with a modacrylic, acrylic, polypropylene, rayon, nylon, vinyon, or saran material. The invention is particularly useful with DuPont dacron type 791 polyester staple. This particular polyester staple has a modulus of 39 grams/denier, a toughness of 0.49 grams/cm., a tenacity of 4.3 grams/denier, and a specific gravity of approximately 1.38. The fibers are generally round in shape and are used in approximately 3-inch lengths. The material is laid up as a felted fiber. That is, the fibers are not in any way bonded together and are simply randomly laid one upon the other to form a felt-like material.

Figure 3:
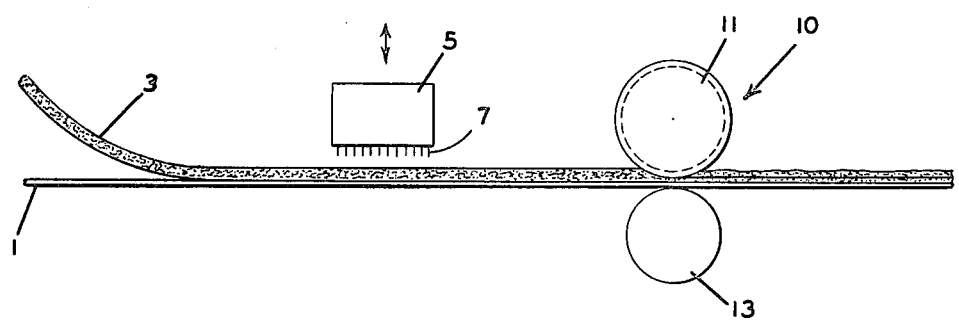
FIG. 3 is a schematic view of the method of manufacturing the product of the invention herein.

In FIG. 3 there is shown generally the process for manufacturing the product herein. The scrim 1 is moved from left to right and has placed on the upper surface thereof the felted material 3. The two layers of material, one laid upon the other, are then moved to a needle-bonding apparatus 5 which is conventional in the art and is basically nothing more than a reciprocating head with a large number of barbed needles mounted thereon. The barbed needles 7 penetrate both the felted material and the scrim. Due to the large concentration of needles per square inch and the rapidity with which the needles are passed through the slowly moving composite two-layer structure, the fibers from the felted material are pushed into the openings of the coarsely woven scrim and are mechanically locked to the scrim and to other fibers within the composite structure. Such a bonding technique is extremely old in the art and has been used extensively in the manufacture of the needle-bonded indoor-outdoor carpeting which is normally sold under the trade name "Ozite TM." If desired, the underneath surface of the needled product may be provided with a conventional carpet latex back coating which will tend to adhesively lock together the fibers on the back surface of the composite product and particularly lock the fibers on the back surface of the scrim. Normally about two-thirds of the felted product after needle-bonding will exist on the upper surface of the scrim with the remaining one-third being within and on the back side of the woven scrim. Application of the latex coat is optional and it simply insures a better bonding of the felted layer to the scrim. The use of latex coatings is quite conventional in the tufted carpet art wherein all tufted carpet is provided with a conventional latex rubber back coating to bond the tufts of carpeting fabric to the scrim of the carpet material. The composite product now needle-bonded together is then passed to an embossing roll assembly 10 which has an upper embossing roll 11 with an embossing surface thereon and a conventional back-up roll 13 which simply supports the product while the surface configuration of embossing roll 11 is placing a pattern on the composite fabric.

The upper embossing roll 11 is heated to an embossing temperature of 480°-520° F. In one preferred embodiment of the invention, the embossing roll is simply provided with a plurality of raised rings or lands so that the finished product is provided with an embossed series of parallel lines on the embossing surface. The material used is the DuPont dacron type 791 polyester staple. This material will have a melt point for the fiber at approximately the temperature of the embossing roll. The embossing roll contacts the needle-bonded felt material 3 and will cause the melting of the fibers contacted by the lands of the embossing roll and the heat embossing of the product will provide a plurality of parallel line structures in the finished product. The combination of the pressure of the embossing roll and the heat results in the definite mechanical deformation of the product and leaves a definite groove in the upper surface of the finished product. The back surface of the product, which is in the direction of the scrim side of the product, is still maintained in its generally flat condition. The areas between the lands of the embossing roll do not emboss the felted needle-bonded product in any way. In the embossed area there is a transmission of heat from the embossing roll to the felted material. Because this heat is at about the melt temperature of the felted material, there is a certain amount of melting of the fibers forming the felted product. The softened or partially melted fibers tend to flow around the yarns forming the coarsely woven pattern of the scrim. In the non-embossed areas, there are yarns extending in both the warp and woof direction due to the fact that the yarns of the scrim are laid in the warp and woof direction. These yarns tend to overlap each other at different directions at the point of intersection and have open areas between the different yarns and, therefore, there is provided on the surface of the felted product raised and non depressed areas. In the embossed areas, particulary large embossed areas, there is a textured effect. The contour of the scrim is mirrored in the felted product which is pressed against the scrim by the embossing means.

It has been particularly noted that when the temperature of embossing is in the range of 480°-520° F. and a polyester staple is being used, there is a definite uniform coloration of the embossed area so that the embossed areas are now provided with a uniform noticeable shade difference varying from the color of the product in its non-embossed areas. This shade variation is uniform down the full length of the embossed areas and provides a noticeably different and very pleasing aesthetic effect in this product versus the product covered by U.S. Pat. No. 3,924,040.

The texture formed is quite delicate and the product still generally retains its fibrous appearance in the embossed areas. The generally textured effect in combination with the embossed pattern provides a very pleasing effect. It is obvious that the flexibility of design can be increased by not only varying the embossed pattern which is placed upon the felted material, but also by varying the characteristics of the scrim utilized. As used herein and particularly in the claims, the term "scrim" is meant to cover both a woven and a non-woven material. It is meant to cover a product which generally has parallel yarns positioned generally in two paths 90° apart and these yarns may be woven or non-woven. The yarns may be held together in a non-woven manner simply by having the yarns heat fused to each other at their points of intersection.

What is claimed is:

1. In a fabric consisting of:
    (a) a scrim which has a first melt temperature and a generally open weave configuration of approximately 8-10 yarns per square inch;
    (b) on the upper surface thereof a felted non-woven fabric of randomly laid synthetic fibers needle-bonded to the scrim and of a melt temperature approximately 50° F. or more below the melt temperature of the scrim;
    (c) the upper surface of the felted fabric being provided with a definite embossed pattern on a part thereof, said pattern extending substantially through the felted fabric to the scrim surface, and embossed areas having a textured surface effect which is the result of a softening and partially melting of the felted fabric to allow it to assume the general surface contour of the underlying scrim, and
    (d) the improvement comprising:
        (1) the felted fabric being made of a selected color and the embossed areas of the embossed pattern having a definite and uniform color shade variation from that of the color of the non-embossed felted fiber areas.

2. In a fabric as set forth in claim 1, the color of the embossed areas is the same basic color as the non-embossed areas, but it differs by a noticeable shade variation therefrom and the shade variation is uniform along the whole length of the embossed area.

3. In a process for making a fabric comprising the steps of:
    (a) moving a scrim with a coarse open weave structure towards a needle-bonding means,
    (b) placing on the upper surface of the scrim a non-woven felted fabric,
    (c) passing both the scrim and its overlying felted fabric covering through a needle-bonding means to needle-bond the felted fiber to the scrim by mechanically locking the fibers of the felted material to the scrim and to themselves,
    (d) passing the resulting composite product with the felted fabric facing upward, to an embossing structure which has its embossing means engaging the upper surface of the composite product, (e) heating said embossing means to 480°–520° F. which is approximately equal to the melt temperature of the melted fabric and substantially below the melt temperature of the scrim;

(f) embossing a pattern on the side of the composite structure containing the felted fabric to provide a definite pattern to the composite product while, at the same time, causing a softening of the individual fibers of the felted fabric in embossed areas to cause said felted fabric to assume the general surface contour of the scrim, whereby there is produced an end product which has both a definite pattern as provided by the embossing means and an irregular surface texturing which results from the softened felted fabric assuming generally the surface contour of the scrim; and (g) the improvement comprising:
  (1) the embossed areas having a definite color shade variation from the color of the non-embossed areas.

* * * * *